United States Patent

Iijima et al.

[11] Patent Number: 5,853,680
[45] Date of Patent: Dec. 29, 1998

[54] PROCESS FOR THE REMOVAL OF HIGHLY CONCENTRATED CARBON DIOXIDE FROM HIGH-PRESSURE NATURAL GAS

[75] Inventors: Masaki Iijima, Tokyo; Shigeaki Mitsuoka, Hiroshima-ken, both of Japan

[73] Assignee: Mitsubishi Jukogyo Kabushiki Kaisha, Tokyo, Japan

[21] Appl. No.: 676,638

[22] Filed: Jul. 10, 1996

[30] Foreign Application Priority Data

Oct. 3, 1995 [JP] Japan .................................. 7-256174

[51] Int. Cl.⁶ ...................................................... B01D 53/62
[52] U.S. Cl. .......................... 423/220; 423/229; 423/232; 588/250
[58] Field of Search .................. 423/226, 228, 423/229, 437 R, 220, 232; 588/250

[56] References Cited

U.S. PATENT DOCUMENTS

| | | | |
|---|---|---|---|
| 3,622,267 | 11/1971 | Bartholome | 423/229 |
| 3,640,052 | 2/1972 | Konoki | 423/437 M |
| 3,642,430 | 2/1972 | Benson | 23/2 |
| 4,101,633 | 7/1978 | Sartori | 423/228 |
| 4,553,984 | 11/1985 | Volkamer | 423/228 |
| 4,654,062 | 3/1987 | Gottier | 423/220 |
| 4,696,803 | 9/1987 | Nieh | 423/229 |
| 4,853,012 | 8/1989 | Batteux et al. | 55/44 |
| 5,061,465 | 10/1991 | Carter et al. | 423/229 |
| 5,344,627 | 9/1994 | Fujii | 423/437 R |

*Primary Examiner*—Gary P. Straub
*Assistant Examiner*—Peter DiMauro
*Attorney, Agent, or Firm*—Bell Setzer Intellectual Property Law Group of Alston & Bird LLP

[57] ABSTRACT

This invention relates to a process for removing highly concentrated $CO_2$ from high-pressure natural gas and recovering it in a high-pressure state.

This process comprises the absorption step of bringing high-pressure natural gas having a $CO_2$ partial pressure of 2 $kg/cm^2$ or greater and a pressure of 30 $kg/cm^2$ or greater into gas-liquid contact with a regenerated $CO_2$-lean absorbing fluid comprising a $CO_2$ absorbing fluid of which the difference in saturated $CO_2$ absorption level between 40° C. and 120° C. is not less than 30 $Nm^3$ per ton of solvent at a $CO_2$ partial pressure of 2 $kg/cm^2$, whereby highly concentrated $CO_2$ present in the high-pressure natural gas is absorbed into the $CO_2$-lean absorbing fluid to produce refined natural gas having a reduced $CO_2$ content and a $CO_2$-rich absorbing fluid; and the regeneration step of heating the $CO_2$-rich absorbing fluid without depressurizing it, whereby high-pressure $CO_2$ having a pressure of 10 $kg/cm^2$ or greater is liberated and a $CO_2$-lean absorbing fluid is regenerated and recycled for use in the absorption step.

9 Claims, 2 Drawing Sheets

PROCESS FOR THE REMOVAL OF HIGHLY CONCENTRATED CARBON DIOXIDE FROM HIGH-PRESSURE NATURAL GAS

BACKGROUND OF THE INVENTION

1. Field of the Invention

This invention relates to a process for the removal of highly concentrated carbon dioxide ($CO_2$) from high-pressure natural gas. More particularly, it relates to a process for the removal of highly concentrated $CO_2$ from high-pressure natural gas whereby, at a natural gas production spot or the like, $CO_2$ is separated and removed from the collected high-pressure natural gas having a pressure of 30 kg/cm$^2$ or greater (the term "pressure" as used herein means an absolute pressure) to produce refined natural gas, and whereby the separated $CO_2$ can be obtained in a relatively high-pressure state which is beneficial for the purpose of injection when it is utilized in tertiary oil recovery or stored permanently in an underground aquifer.

2. Description of the Related Art

It may usually happen that natural gas produced in a gas field contains an appreciable amount of $CO_2$. According to the necessity for reducing the cost required to transport such natural gas from its production spot to a remote consumption place, and for adjusting its calorific value to the standard at the consumption place, some $CO_2$ is previously removed therefrom to produce refined natural gas having a $CO_2$ content ranging from 2–3 vol. % to ten-odd vol. %. Conventionally, the $CO_2$ separated by primary refining at the natural gas production spot or in the neighborhood thereof has seldom been utilized. That is, such $CO_2$ has been dumped directly into the atmosphere or has rarely been used as an injection gas for tertiary oil recovery in an oil field. Accordingly, little consideration has been given to the pressure of the $CO_2$ separated by the aforesaid refining process.

In recent years, global warming due to an increase of atmospheric $CO_2$ has come to be regarded as a problem. Accordingly, the present situation is such that the $CO_2$ separated in the above-described manner must be pressurized in order to inject it into an underground aquifer for the purpose of permanent storage or to use it positively for the purpose of tertiary oil recovery. However, in spite of the fact that high-pressure natural gas is treated, the $CO_2$ separated by a conventionally employed process for the removal of $CO_2$ from natural gas has a low pressure close to atmospheric pressure. This is disadvantageous in that, for the above-described purpose of permanent storage or tertiary oil recovery, the $CO_2$ must be pressurized from a low pressure close to atmospheric pressure to a pressure of about 150 kg/cm$^2$ which is required for injection.

SUMMARY OF THE INVENTION

As a result of intensive investigations on the above-described problems concerning the removal of $CO_2$ from natural gas and the disposal and utilization of the separated $CO_2$, the present inventors have found that, by employing a specific process using, among various absorbing fluids having the ability to absorb $CO_2$, an absorbing fluid having so-called physical absorbing power characterized by the marked temperature dependence of saturated $CO_2$ absorption level, $CO_2$ having a much higher pressure than that obtained by conventional processes can be separated at low energy cost with much more simplified equipment than used in conventional systems. The present invention has been completed on the basis of this finding.

That is, the present invention provides a method by which carbon dioxide that has conventionally been dumped into the atmosphere during the collection of natural gas can be separated and recovered in a high-pressure state permitting underground dumping in conformance with recent global environmental standards. This method enables the separated carbon dioxide to be dumped into the ground without using a compressor. Alternatively, it also enables the separated carbon dioxide to be returned to the top of an underground oil stratum in an oil field. Thus, the intended object can be accomplished by employing a system of simple construction.

According to the present invention, there is provided a process for the removal of highly concentrated $CO_2$ from high-pressure natural gas which comprises the absorption step of bringing high-pressure natural gas having a $CO_2$ partial pressure of 2 kg/cm$^2$ or greater and a pressure of 30 kg/cm$^2$ or greater into gas-liquid contact with a regenerated $CO_2$-lean absorbing fluid comprising a $CO_2$ absorbing fluid of which the difference in saturated $CO_2$ absorption level between 40° C. and 120+ C. is not less than 30 Nm$^3$ per ton of solvent at a $CO_2$ partial pressure of 2 kg/cm$^2$, whereby highly concentrated $CO_2$ present in the high-pressure natural gas is absorbed into the $CO_2$-lean absorbing fluid to produce refined natural gas having a reduced $CO_2$ content and a $CO_2$-rich absorbing fluid; and the regeneration step of heating the $CO_2$-rich absorbing fluid without depressurizing it, whereby high-pressure $CO_2$ having a pressure of 10 kg/cm$^2$ or greater is liberated and a $CO_2$-lean absorbing fluid is regenerated and recycled for use in the absorption step.

After having absorbed $CO_2$, the $CO_2$ absorbing fluid used in the present invention is regenerated in the regeneration step where most of the $CO_2$ is liberated therefrom, and then recycled for use in the absorption step. In the present invention, the $CO_2$ absorption capacity of the aforesaid $CO_2$ absorbing fluid must be such that the difference in saturated $CO_2$ absorption level between 40° C. and 120° C. is not less than 30 Nm$^3$ per ton of solvent, preferably not less than 40 Nm$^3$ per ton of solvent, at a $CO_2$ partial pressure of 2 kg/cm$^2$. Usually, if the temperature and $CO_2$ partial pressure of a specific absorbing fluid are determined, the saturated $CO_2$ absorption level shows a definite value based on the saturated $CO_2$ absorption curve for the specific absorbing fluid, almost regardless of the type of the $CO_2$-containing gas. In the present invention, $CO_2$ is removed from high-pressure natural gas having a pressure of 30 kg/cm$^2$ or greater by absorbing it into a $CO_2$-lean absorbing fluid obtained by regenerating the $CO_2$ absorbing fluid in the succeeding regeneration step, and the resulting $CO_2$-rich absorbing fluid is heated without substantially depressurizing it, so as to liberate $CO_2$ therefrom. Accordingly, it is preferable to use an absorbing fluid which can absorb $CO_2$ easily at a relatively low temperature and a lower $CO_2$ partial pressure than in the regeneration step, and can liberate $CO_2$ easily when heated in the regeneration step, i.e., at a relatively high temperature and a relatively high $CO_2$ partial pressure.

The temperature dependence of the saturated $CO_2$ absorption level of an absorbing fluid depends largely on the types of the chemical agent(s) and solvent constituting the absorbing fluid. In the present invention, the difference in saturated $CO_2$ absorption level between 40° C. and 120° C. at a certain $CO_2$ partial pressure (i.e., a $CO_2$ partial pressure of 2 kg/cm$^2$) is employed as an index to the ability of an absorbing fluid to absorb $CO_2$ in the absorption step and liberate $CO_2$ when heated in the regeneration step. Thus, there is used an absorbing fluid of which the difference in saturated $CO_2$ absorption level between 40° C. and 120° C. at a $CO_2$ partial pressure of 2 kg/cm² is not less than 30 Nm³ per ton of solvent and preferably not less than 40 Nm³ per ton of solvent. No particular limitation is placed on the type of the absorbing fluid, provided that its difference in saturated $CO_2$ absorption level between 40° C. and 120° C. at the aforesaid $CO_2$ partial pressure is not less than 30 Nm³ per ton of solvent and it is stable at the heating temperature of the regeneration step. Moreover, when the $CO_2$ partial pressure is 2 kg/cm², the saturated $CO_2$ absorption level at 40° C. serves as an index to the $CO_2$ absorption capacity of the $CO_2$-lean absorbing fluid. In the present invention, it is preferable to use an absorbing fluid of which this absorption level is not less than 30 Nm³ per ton of solvent and more preferably not less than 40 Nm³ per ton of solvent.

Specific examples of the aforesaid absorbing fluid include an aqueous solution of N-methyldiethanolamine (MDEA), an aqueous solution of triethanolamine, and an aqueous solution of potassium carbonate, as well as these solutions having a $CO_2$ absorption promoter (e.g., piperazine) added thereto.

When it is desired to absorb and remove highly concentrated $CO_2$ present in natural gas and thereby obtain the separated $CO_2$ in a high-pressure state suitable for use in tertiary oil recovery or for the underground storage of $CO_2$, the process of the present invention has the advantage of simplifying the equipment and reducing the energy cost.

DETAILED DESCRIPTION OF PREFERRED EMBODIMENTS

An exemplary system which can be employed to carry out the process of the present invention is specifically described below with reference to FIG. 1. For purposes of comparison, an exemplary system which has conventionally been employed is illustrated in FIG. 2.

Figure 1:
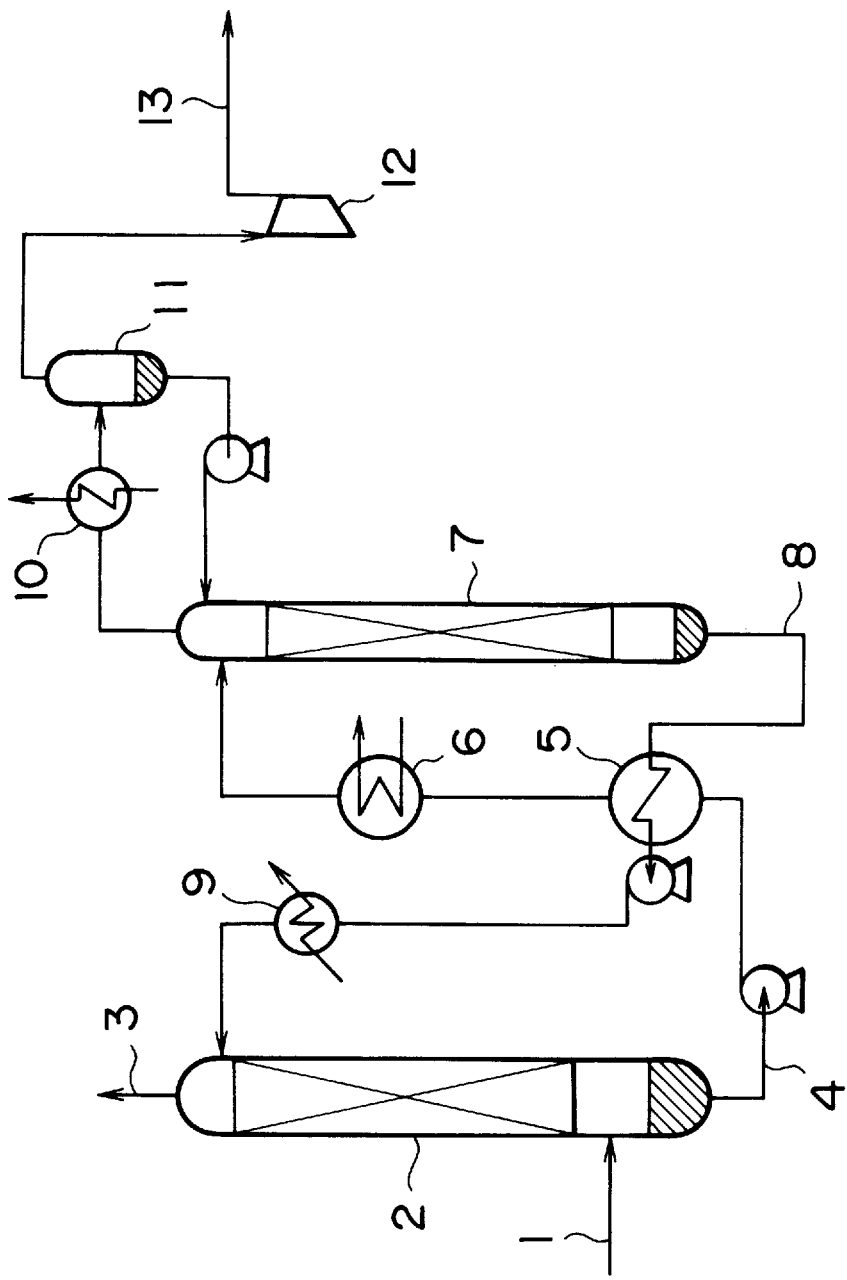
FIG. 1 illustrates an exemplary system which can be employed to carry out the process for the removal of $CO_2$ from high-pressure natural gas in accordance with the present invention.
Figure 2:
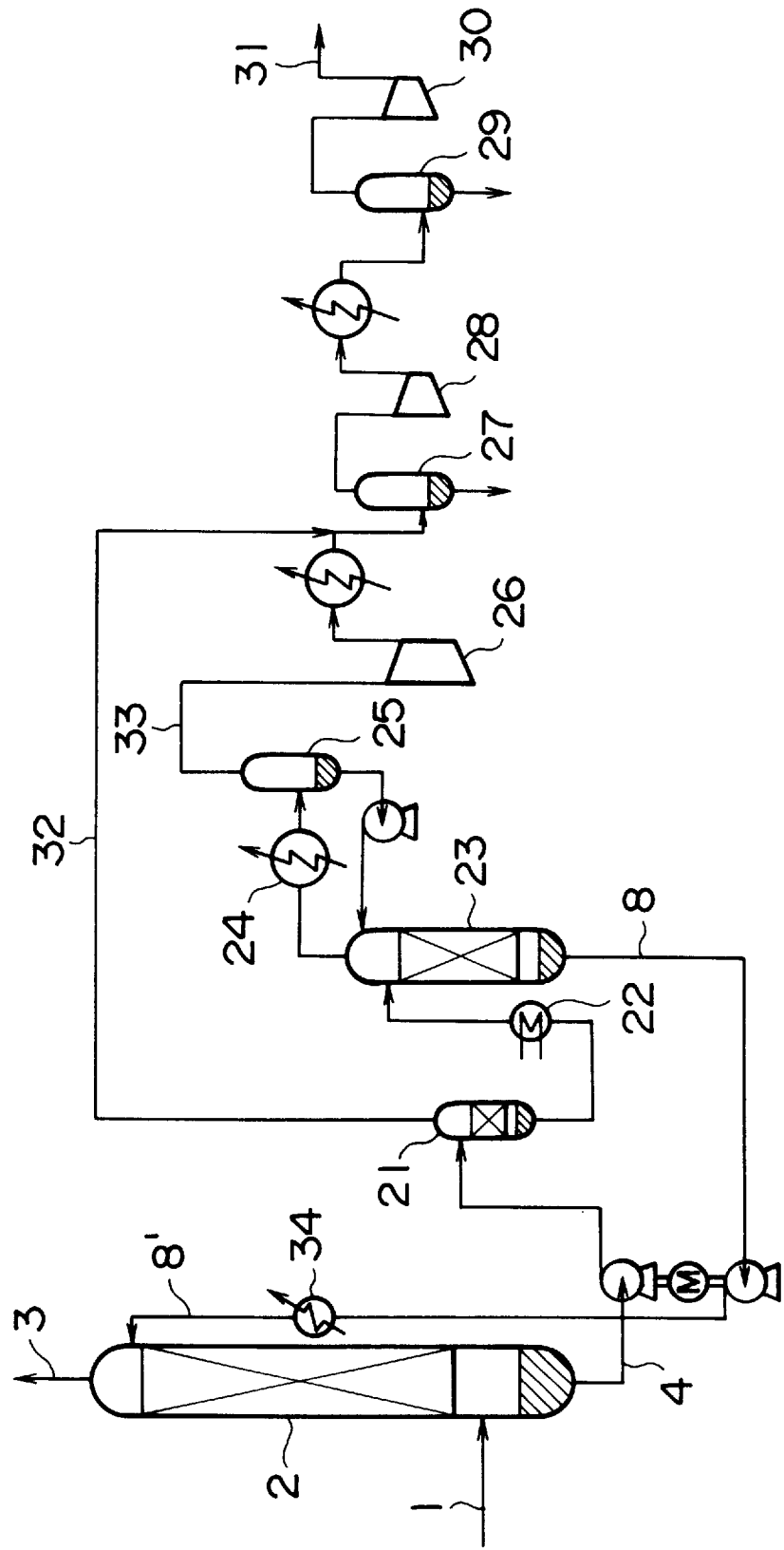
FIG. 2 illustrates an exemplary system which can be employed to carry out a conventional process for the removal of $CO_2$ from high-pressure natural gas.

In FIG. 1, reference numeral 1 designates natural gas; 2, an absorption tower; 3, refined natural gas; 4, a $CO_2$-rich absorbing fluid; 5, a heat exchanger; 6, a heater; 7, a regeneration tower; 8, a $CO_2$-lean absorbing fluid; 9, a cooler; 10, an overhead condenser; 11, a separating drum; 12, a compressor; and 13, high-pressure $CO_2$. By way of example, the conditions for removing $CO_2$ from natural gas by employing the system of FIG. 1 and using a 45 wt. % aqueous solution of MDEA as absorbing fluid are given below. Natural gas 1 having a $CO_2$ content of 26 vol. %, a pressure of 58 kg/cm² and a temperature of 25° C. is fed to the lower part of an absorption tower 2. This absorption tower 2 is packed, for example, with an irregular packing material so that the ascending natural gas will come into efficient gas-liquid contact with a $CO_2$-lean absorbing fluid fed to the upper part thereof. The refined natural gas 3 having been freed of $CO_2$ by contact with the $CO_2$-lean absorbing fluid, which now has a $CO_2$ content of 2 vol. %, a temperature of 50° C. and a pressure of 58 kg/cm², is discharged from the top of absorption tower 2. On the other hand, the $CO_2$-lean absorbing fluid having absorbed $CO_2$ turns into a $CO_2$-rich absorbing fluid 4, which is transferred to a regeneration step by means of a pump and regenerated therein.

The regeneration step essentially comprises a heat exchanger 5, a heater 6 and a regeneration tower 7. $CO_2$-rich absorbing fluid 4 is heated in heat exchanger 5 by heat exchange with a hot $CO_2$-lean absorbing fluid 8 which will be described later, further heated with heater 6 using steam as a heat source, and then fed to regeneration tower 7. The purpose of regeneration tower 7 is to separate $CO_2$, which has been liberated by the aforesaid heating, from the absorbing fluid to produce a $CO_2$-lean absorbing fluid. Although an additional heater such as a reboiler is not required, it may be installed as desired. The liberated $CO_2$ is cooled in overhead condenser 10 and separated from any entrained absorbing fluid in a separating drum 11. This $CO_2$, which has a relatively high pressure of 55 kg/cm² at about 40° C., is compressed to a pressure of 150 kg/cm² by means of a compressor 12. The resulting high-pressure $CO_2$ is used for purposes of tertiary oil recovery or stored in the earth.

On the other hand, the $CO_2$-lean absorbing fluid 8 withdrawn from the bottom of regeneration tower 7, which has a temperature of about 140° C., is cooled in heat exchanger 5 by heating $CO_2$-rich absorbing fluid 4 as described above, further cooled with a cooler 9 using cooling water, seawater or the like, and then recycled to the upper part of absorption tower 2.

Now, the above-described process for the removal of $CO_2$ from high-pressure natural gas in accordance with the present invention is compared with a conventional system illustrated in FIG. 2. In FIG. 2, the units and elements having the same functions as those shown in FIG. 1 are designated by the same reference numerals. In the system of FIG. 2, natural gas 1 is fed in the same manner as in FIG. 1, and $CO_2$ is absorbed and removed therefrom under the same conditions as in FIG. 1. The resulting gas is discharged from the top of absorption tower 2 as refined natural gas 3. On the other hand, the resulting $CO_2$-rich absorbing fluid 4 is withdrawn by means of a pump and then flashed in a first flash drum 21 to produce the liberated $CO_2$ 32 and the absorbing fluid having a reduced $CO_2$ content. The latter is further heated with a heater 22 and fed to a second flash drum 23 where it is flashed again. The liberated $CO_2$ 33 is recovered by way of an overhead condenser 24 and a first separating drum 25. Since the $CO_2$ liberated in second flash drum 23 has approximately atmospheric pressure, it is compressed with a first compressor 26 and combined with the aforesaid liberated $CO_2$ 32. The combined $CO_2$ is passed through a second separating drum 27, a second compressor 28, a third separating drum 29 and a third compressor 30 to obtain high-pressure $CO_2$ 31 having a pressure of about 150 kg/cm². On the other hand, the $CO_2$-lean absorbing fluid 8 obtained at approximately atmospheric pressure is pressurized with a pressurizing pump and cooled with a cooler 34 to produce a $CO_2$-lean absorbing fluid 8', which is fed to the upper part of absorption tower 2.

It is evident from a comparison of FIGS. 1 and 2 that, in order to obtain the liberated $CO_2$ having an identical pressure of 150 kg/cm², the process of the present invention illustrated in FIG. 1 brings about a marked simplification of equipment. In particular, it can be seen that the number of compressors involving a rotary driving mechanism requiring troublesome operational management can be largely decreased. Moreover, in the case where the aforesaid aqueous solution of MDEA is used as absorbing fluid, the amounts of energy required for both systems have been calculated from the saturated $CO_2$ absorption curve for the absorbing fluid, and the results thus obtained are summarized in Table 1. The thermal efficiency of power units is supposed to be 25%.

TABLE 1

|  | FIG. 1 (Example) | FIG. 2 (Comparative Example) |
|---|---|---|
| Feed rate of natural gas ($Nm^3/H$) (25° C.; 58 $kg/cm^2$; $CO_2$ content, 26 vol. %) | 37,852 | 37,852 |
| Discharge rate of refined natural gas ($Nm^3/H$) (50° C.; 57.9 $kg/cm^2$; $CO_2$ content, 2 vol. %) | 28,310 | 28,310 |
| Circulation rate of absorbing fluid (T/H) | 555 | 555 |
| Total flow rate of liberated $CO_2$ ($Nm^3/H$) | 9,542 | 9,542 |
| $CO_2$ pressure at the outlet of first compressor ($kg/cm^2$) | — | 4.8 |
| (Compressor power, kW) | | (450) |
| $CO_2$ pressure at the outlet of second compressor ($kg/cm^2$) | — | 30 |
| (Compressor power, kW) | | (937) |
| $CO_2$ pressure at the outlet of third compressor ($kg/cm^2$) | — | 150 |
| (Compressor power, kW) | | (695) |
| $CO_2$ pressure at the outlet of compressor 12 ($kg/cm^2$) | 150 | — |
| (Compressor power, kW) | (181) | |
| Power other than $CO_2$ compressor power (kW) | 80 | 1,159 |
| Total power (kW) | 261 | 3,241 |
| Total quantity of heat used to heat $CO_2$-rich absorbing fluid (Kcal/H) | $10.5 \times 10^6$ | $1.07 \times 10^6$ |
| Total power calculated by converting the quantity of heat into power (kW) (thermal efficiency $\eta = 25\%$) | 3,313 | 3,552 |

We claim:

1. A process for a removal of highly concentrated carbon dioxide from high-pressure natural gas which comprises:

an absorption step of bringing high-pressure natural gas having a carbon dioxide partial pressure of 2 $kg/cm^2$ (absolute pressure) or greater, and a pressure of 30 $kg/cm^2$ (absolute pressure) or greater, into gas-liquid contact with a regenerated carbon dioxide-lean absorbing fluid, said carbon dioxide-lean absorbing fluid having saturated carbon dioxide absorption levels at 40° C. and 120 20 C. which differ by at least 30 $Nm^3$ per metric ton of solvent at a carbon dioxide partial pressure of 2 $kg/cm^2$ (absolute pressure), whereby highly concentrated carbon dioxide present in the high-pressure natural gas is absorbed into the carbon dioxide-lean absorbing fluid, to produce refined natural gas having a reduced carbon dioxide content and a carbon dioxide-rich absorbing fluid;

a regeneration step of heating the carbon dioxide-rich absorbing fluid without depressurizing it under conditions effective to liberate high pressure carbon dioxide having a pressure of 10 $kg/cm^2$ (absolute pressure) or greater and a carbon dioxide-lean absorbing fluid is regenerated; and a recycling step of recycling said regenerated carbon dioxide-lean absorbing fluid to said absorption step.

2. A process for disposal of highly concentrated carbon dioxide present in high-pressure natural gas which comprises:

an absorption step of bringing high-pressure natural gas having a carbon dioxide partial pressure of 2 $kg/cm^2$ (absolute pressure) or greater, and a pressure of 30 $kg/cm^2$ (absolute pressure) or greater, into gas-liquid contact with a regenerated carbon dioxide-lean absorbing fluid, said carbon dioxide-lean absorbing fluid having saturated carbon dioxide absorption levels at 40° C. and 120° C. which differ by at least 30 $Nm^3$ per metric ton of solvent at a carbon dioxide partial pressure of 2 $kg/cm^2$ (absolute pressure), whereby highly concentrated carbon dioxide present in the high-pressure natural gas is absorbed into the carbon dioxide-lean absorbing fluid, to produce refined natural gas having a reduced carbon dioxide content and a carbon dioxide-rich absorbing fluid;

a regeneration step of heating the carbon dioxide-rich absorbing fluid without depressurizing it under conditions effective to liberate high-pressure carbon dioxide having a pressure of 10 $kg/cm^2$ (absolute pressure) or greater and carbon dioxide is dumped into an underground zone, and a carbon dioxide-lean absorbing fluid is regenerated; and a recycling step of recycling said regenerated carbon dioxide-lean absorbing fluid to said absorption step.

3. A process for a disposal of highly concentrated carbon dioxide present in high-pressure natural gas which comprises:

an absorption step of bringing high-pressure natural gas having a carbon dioxide partial pressure of 2 $kg/cm^2$ (absolute pressure) or greater, and a pressure of 30 $kg/cm^2$ (absolute pressure) or greater, into gas-liquid contact with a regenerated carbon dioxide-lean absorbing fluid, said carbon dioxide-lean absorbing fluid having saturated carbon dioxide absorption levels at 40° C. and 120° C. which differ by at least 30 $Nm^3$ per metric ton of solvent at a carbon dioxide partial pressure of 2 $kg/cm^2$ (absolute pressure), whereby highly concentrated carbon dioxide present in the high-pressure natural gas is absorbed into the carbon dioxide-lean absorbing fluids to produce refined natural gas having a reduced carbon dioxide content and a carbon dioxide-rich absorbing fluid;

a regeneration step of heating the carbon dioxide-rich absorbing fluid without depressurizing it under conditions effective to liberate high-pressure carbon dioxide having a pressure of 10 $kg/cm^2$ (absolute pressure) or greater and carbon dioxide is returned to a top of an underground oil stratum, and a carbon dioxide-lean absorbing fluid is regenerated; and a recycling step of recycling said regenerated carbon dioxide-lean absorbing fluid to said absorption step.

4. A process for disposal of highly concentrated carbon dioxide present in high-pressure natural gas according to claim 1, wherein said carbon dioxide absorbing fluid is an aqueous solution of one or more compounds selected from the group consisting of N-methyldiethanolamine, triethanolamine and potassium carbonate.

5. A process for disposal of highly concentrated carbon dioxide present in high-pressure natural gas according to claim 2, wherein said carbon dioxide absorbing fluid is an aqueous solution of one or more compounds selected from the group consisting of N-methyldiethanolamine, triethanolamine and potassium carbonate.

6. A process for disposal of highly concentrated carbon dioxide present in high-pressure natural gas according to claim 3, wherein said carbon dioxide absorbing fluid is an aqueous solution of one or more compounds selected from the group consisting of N-methyldiethanolamine, triethanolamine and potassium carbonate.

7. A process for disposal of highly concentrated carbon dioxide present in high-pressure natural gas according to claim 4, wherein said aqueous solution further includes piperazine therein.

8. A process for disposal of highly concentrated carbon dioxide present in high-pressure natural gas according to claim 5, wherein said aqueous solution further includes piperazine therein.

9. A process for disposal of highly concentrated carbon dioxide present in high-pressure natural gas according to claim 6, wherein said aqueous solution further includes piperazine therein.

* * * * *

UNITED STATES PATENT AND TRADEMARK OFFICE
CERTIFICATE OF CORRECTION

PATENT NO. : 5,853,680
DATED : December 29, 1998
INVENTOR(S) : Iijima et al.

It is certified that error appears in the above-identified patent and that said Letters Patent is hereby corrected as shown below:

On the title page, item [56]
In the References Cited, U.S. PATENT DOCUMENTS, line 1 "Bartholome" should read --Bartholome et al.--; line 2, "Konoki" should read --Konoki et al.--; line 4, "Sartori" should read --Sartori et al.--; line 9, "Carter et al." should read --Carter--; line 10, "Fujii" should read --Fujii et al.--.

Column 5, line 44, "12020" should read --120°--.

Column 6, line 35, "fluids" should read --fluid,--.

Signed and Sealed this

Third Day of August, 1999

Attest:

Q. TODD DICKINSON

Attesting Officer

Acting Commissioner of Patents and Trademarks